Figure 1:
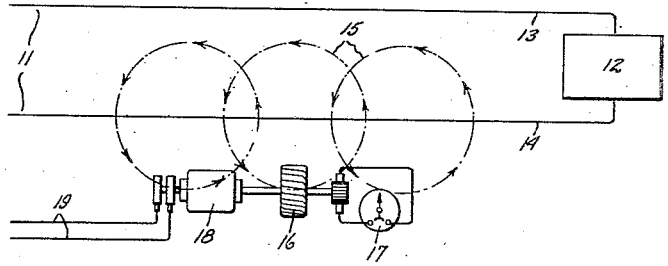

June 11, 1935.  B. A. G. CHURCHER  2,004,780

ELECTRICAL MEASURING SYSTEM

Filed April 30, 1934

Inventor:
Brian A. G. Churcher
by Harry E. Dunham
His Attorney.

Patented June 11, 1935

2,004,780

UNITED STATES PATENT OFFICE 2,004,780

ELECTRICAL MEASURING SYSTEM

Brian A. G. Churcher, Bowdon, England, assignor to General Electric Company, a corporation of New York Application April 30, 1934, Serial No. 723,249
In Great Britain May 5, 1933

5 Claims. (Cl. 171—95)

My invention relates to electrical measuring systems, particularly current-responsive systems, and has for its principal object the provision of methods and apparatus for measuring high-potential currents in which a current-responsive element need not be connected to the high-tension circuit. Other and further objects and advantages will become apparent as the description proceeds.

In accordance with my invention in its preferred form, a current-conducting coil is rotated or vibrated in the magnetic field produced by the current to be measured and a galvanometer or other current or voltage-responsive device is connected to the coil. If desired, the magnetic field may be intensified by means of a core of ferromagnetic material surrounding a conductor carrying the current to be measured and having an air gap in which the coil is made to move.

The features of my invention which I believe to be novel and patentable will be pointed out in the claims appended hereto. My invention, itself, however, may be better understood by referring to the following description taken in connection with the accompanying drawing in which Fig. 1 is a schematic diagram illustrating an embodiment of my invention; and Figs. 2 and 3 are schematic diagrams of modified forms of my invention.

Referring more in detail to the drawing in which like reference characters designate like parts throughout, a source of current 11 is represented as supplying a load 12, which may be of any character, through a pair of conductors 13 and 14. When current flows through the conductors 13 and 14, a magnetic field will, of course, be set up about the conductors and a portion of this field is represented in Fig. 1 by means of the circular arrows 15. To obtain a response to the presence or to the magnitude of current in conductor 14, a coil represented at 16 is moved within the magnetic field 15, preferably in accordance with some predetermined law of relationship between time and position. A voltage-responsive device, such as a galvanometer 17, for example, connected to the coil 16 serves to indicate the magnitude of current flowing in conductor 14.

Preferably, the coil 16 is moved in magnetic field 15 in such a manner that the component of velocity of any point in the coil 16 perpendicular to the direction of the magnetic field 15 at the coil 16 varies sinusoidally with respect to time. This may be accomplished, for example, as shown in Fig. 1 by rotating the coil 16 by means of a synchronous motor 18 supplied with alternating current by a suitable constant-frequency source 19. The constant-frequency source 19, which forms no part of my invention, may be of any desired type such as a tuned vacuum-tube oscillator or a tuning fork controlled generator, for instance, where precise readings are desired. It is apparent that the movable pick-up or detecting coil 16 and the voltage-responsive device 17 are wholly insulated from conductors 13 and 14 and that the apparatus may safely be employed regardless of the voltage of the circuit 11.

Figure 2:
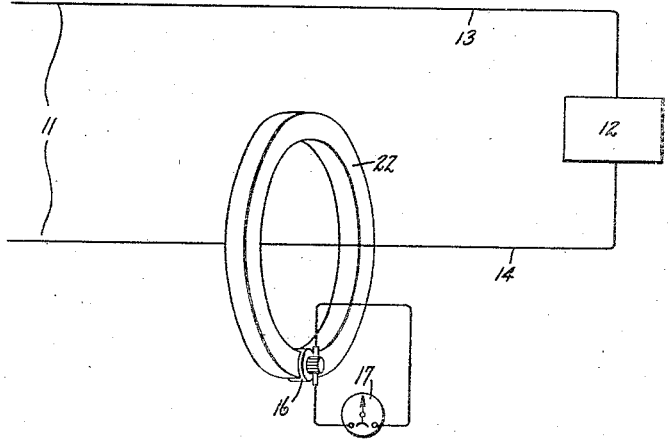
Figure 3:
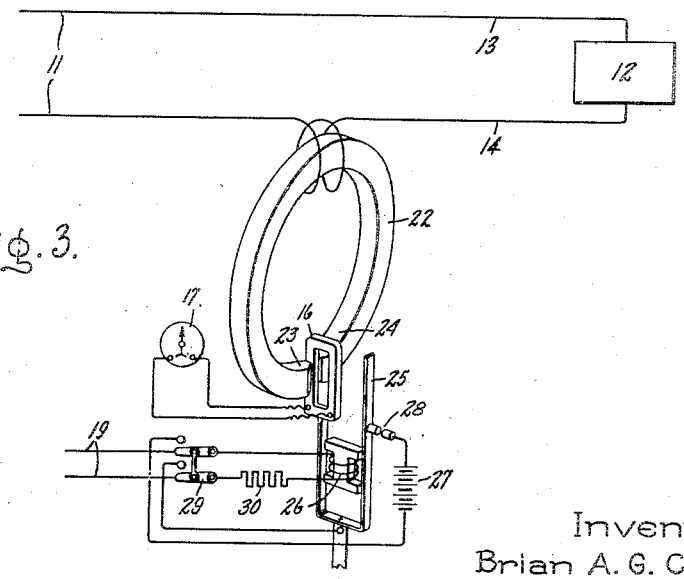

In the apparatus illustrated in Figs. 1 and 2, the current-conducting coil 16, may, if desired, take the form of a generator armature winding connected to the current-responsive device 17 through slip rings or through a commutator.

In the arrangement illustrated in Fig. 2, the magnetic field acting upon the rotating coil or armature 16 is intensified by means of a yoke 22 of high-permeability magnetic material, such as soft iron, for example, having a gap to receive the revolving armature 16, which may be mounted, if desired, in bearings, not shown, supported by the yoke 22.

In order that the instrument 17 may be calibrated in terms of the current flowing in conductor 14, it is, of course, essential that the position of the coil 16 with respect to the magnetic field 15 varies uniformly or that the variation follows regularly repeated cycles. For example, if the coil 16 is moved in such a manner that the component of velocity of any point in the winding 16 perpendicular to the direction of the magnetic field 15 varies sinusoidally with respect to time, the amplitude and frequency of the sinusoidal wave should be substantially constant. In the arrangement of Fig. 1 where the coil is rotated, the amplitude of vibration is, of course, constant and the frequency is maintained constant by rotating the coil 16 at constant speed.

If the coil 16 is actually vibrated instead of being rotated, care should be taken to obtain a substantially constant frequency and amplitude of vibration. In the arrangement of Fig. 3, the coil 16 is so mounted on a tuning fork 25 or other vibrating device, preferably having a natural frequency of vibration, that the coil 16 is moved partially in and out of the magnetic field between the pole pieces 23 and 24 of the yoke 22. The tuning fork 25 is maintained in vibration by means of a coil 26 in inductive relation with the vibrating arms of the fork 25, and supplied with alternating or pulsating current furnishing impulses at the same rate as the natural rate of vibration of the fork 25. For example, the coil 26 may be energized by a constant-frequency alternating-current source 19 of any desired type, or, if desired, it may be energized instead by means of a source of direct current 27 through a vibrating contact 28 carried by a vibrating arm of the fork 25 so as to intercept the current to winding 26 at the rate of vibration of fork 25 which tends to vibrate at its natural rate. The double-pole double-throw switch 29 is moved to the upward position when it is desired to operate the apparatus in the manner just described. In order to maintain the impedance of the circuit of coil 26 relatively constant and thus minimize variations in current therein and in the amplitude of vibration, a relatively large resistor 30 may, if desired, be connected in series with coil 26.

Also, in order to obtain substantially constant amplitude of vibration of the fork 25, the parts are preferably so designed that the magnetic circuit, or a portion thereof, formed by the arms of the fork 25 and the coil 26 is rather highly saturated so that slight variations in the current supplied to coil 26 will have relatively little effect upon the maximum magnetic flux produced by the coil 26 and, consequently, the maximum magnetic pull on the fork 25 which depends upon the flux strength will remain substantially constant, causing the fork 25 to vibrate with substantially constant amplitude.

In accordance with the provisions of the patent statutes, I have described the principle of operation of my invention together with the apparatus which I now consider to be the best embodiment thereof, but I desire to have it understood that the apparatus shown is only illustrative and that the invention may be carried out by other means.

What I claim as new and desire to secure by Letters Patent of the United States, is:

1. Current-responsive apparatus comprising in combination, a current-conducting winding movable in the magnetic field produced by current to which the apparatus is intended to respond, means for vibrating said winding in said field, and means responsive to voltage produced in said winding.

2. Current-responsive apparatus comprising in combination, a core of magnetic material linking an electrical circuit, to the current in which the apparatus is intended to be responsive, said core having an air gap, a current-conducting winding movable in said air gap, means for vibrating said winding in said air gap, and means responsive to voltage induced in said winding.

3. A current-responsive apparatus comprising in combination, a core of magnetic material linking an electrical circuit, to the current in which the apparatus is intended to be responsive, said core having an air gap therein, a current-conducting winding movable in said air gap, a magnetic vibrating member supporting said winding, an electromagnet in inductive relation with said vibrating member, a source of pulsating current energizing said electromagnet to vibrate said winding in its air gap, and means responsive to voltage induced in said winding.

4. Current-responsive apparatus comprising in combination, a core of magnetic material linking an electrical circuit, to the current in which the apparatus is intended to be responsive, said core having an air gap therein, a current-conducting winding movable in said air gap, means responsive to voltage induced in said winding, and an electromagnetic vibratory device supporting said winding, said vibratory device comprising a member of magnetic material mounted to permit vibration thereof, a stationary member of magnetic material forming with said vibratory member a magnetic circuit, a magnetizing winding in inductive relation with said magnetic circuit, and means for supplying periodic current pulsations to said winding, one of the members forming said magnetic circuit having a saturating portion of reduced cross section therein, whereby a substantially constant amplitude of vibration is obtained independent of fluctuations in average magnitude of said supply current.

5. Current-responsive apparatus comprising in combination, a core of magnetic material linking an electrical circuit, to the current in which the apparatus is intended to be responsive, said core having an air gap therein, a current-conducting winding movable in said air gap, means responsive to voltage induced in said winding, and a vibratory member supporting said winding so as to vibrate it in said air gap, said vibratory member having a natural frequency of vibration, and means for driving said vibratory member at its natural frequency of vibration, whereby the frequency of vibration of said winding remains substantially constant.

BRIAN A. G. CHURCHER.